US008089373B2

(12) United States Patent
Beale et al.

(10) Patent No.: US 8,089,373 B2
(45) Date of Patent: Jan. 3, 2012

(54) SIGN SYSTEM FOR ROADS

(76) Inventors: Harry A. Beale, Charlotte, NC (US); Joshua Todd Andrew Beale, Canal Winchester, OH (US); Sonia Leigh Berry, Austin, TX (US); Stephen D. Berry, Austin, TX (US); James Malcolm Beale, San Francisco, CA (US)

( * ) Notice: Subject to any disclaimer, the term of this patent is extended or adjusted under 35 U.S.C. 154(b) by 552 days.

(21) Appl. No.: 12/081,828

(22) Filed: Apr. 22, 2008

(65) Prior Publication Data

US 2008/0216371 A1 Sep. 11, 2008

Related U.S. Application Data

(63) Continuation-in-part of application No. 11/493,738, filed on Jul. 26, 2006, now abandoned.

(51) Int. Cl.

| | |
|---|---|
| ***G08G 1/09*** | (2006.01) |
| ***B60Q 1/00*** | (2006.01) |
| ***G08B 1/08*** | (2006.01) |

(52) U.S. Cl. ..................... 340/905; 340/901; 340/425.5; 340/539.1

(58) Field of Classification Search ................... 340/905
See application file for complete search history.

(56) References Cited

U.S. PATENT DOCUMENTS

| | | | | |
|---|---|---|---|---|
| 6,317,058 | B1 * | 11/2001 | Lemelson et al. | 340/910 |
| 6,442,473 | B1 * | 8/2002 | Berstis et al. | 701/117 |
| 7,109,884 | B2 * | 9/2006 | Glynn | 340/907 |
| 7,167,105 | B2 * | 1/2007 | Butzer et al. | 340/907 |
| 2004/0128891 | A1 | 7/2004 | Keach | |
| 2006/0095199 | A1 | 5/2006 | Lagassey | |

OTHER PUBLICATIONS

Written Opinion of the International Searching Authority, dated Jan. 28, 2008.
nternational Search Report dated Jan. 28, 2008, issued in PCT/US2007/74469.

* cited by examiner

*Primary Examiner* — Donnie Crosland
(74) *Attorney, Agent, or Firm* — Pitts, Lake & Bell, P.C.

(57) ABSTRACT

A sign system for roads includes a back sign. The back sigh has a mount affixed to the ground that is adjacent to a road. A back sign device is affixed to the mount. The mount has a front face that is visible to oncoming traffic. The back sign device is located on a rear face visible to traffic that has passed the back sign, wherein a driver may observe the back sign device in a mirror mounted upon their vehicle after passing the back sign device and the back sign provides information to the driver. The sign system for roads may further include a broadcasting unit. The broadcasting unit may be in communication with a receiving unit being positioned in a vehicle and is adapted to communicate with the driver. When the driver of said vehicle approaches the back sign, the receiving unit can alert the driver of additional information.

25 Claims, 5 Drawing Sheets

SIGN SYSTEM FOR ROADS

RELATED APPLICATION

This application is a continuation-in-part of a U.S. patent application Ser. No. 11/493,738 filed Jul. 26, 2006, which is abandoned.

FIELD OF INVENTION

The instant application relates to a sign system for roads.

BACKGROUND OF THE INVENTION

Road signs are signs that are adjacent to a road that provide information to the drivers and passengers of vehicles traveling on the road. Road signs can give information about many things, including: the speed limit, distances, road conditions, crossings, exit information, advertisements, etc.

Current road signs include a mount and a sign. The mount provides a foundation for the road sign and prevents the road sign from being moved out of position. The sign provides a surface for information to be printed upon to be displayed to approaching vehicles. The sign is mounted on a face that is visible to oncoming traffic. As vehicles approach the road sign, the driver and/or passenger of a vehicle may see the sign and read the information printed on the sign. Sign technology is highly developed and reflective surfaces are well exploited. Backward signs are disclosed in U.S. Pat. No. 7,124,526 to Keach, but without any discussion of advantages or restrictions as to availability of information to only interested drivers. Such unrestricted deployment is a distraction and, therefore, a safety hazard which should require a pre-emptive warning.

One problem with current road signs is they are insufficient in providing all of the information necessary for the drivers of certain vehicles. For example, a driver of a large truck can read a road sign that shows a fuel station at a certain exit and take the exit thinking that the fuel station is accessible to trucking rigs. The driver may exit off of the highway only to find that the fuel station is not accessible to trucking rigs. The truck driver then must find a safe place to turn the trucking rig around, get back on the highway, and proceed to look for another fuel station, where the same situation may occur. This problem could be corrected by providing additional information to the driver of the truck about whether or not the fuel station is accessible to trucking rigs. The information could be added to the front of the sign, but most signs are already full. Readability at road speed, sign size, and potential interest to a wide cross-section of the users of the roadway are important considerations. Federal and state regulations prevent certain signs from being any larger than they already are and also restrict the quantities and locations of signs. Further, certain information is surely not of interest to all drivers or passengers of many vehicles. In addition, some states provide a radio message to travelers on the roadway and the availability of the radio station is made known to drivers via signs along the roadway. This requires the driver of the vehicle to search for the station while driving, which results in a potential safety hazard, particularly with the absence of station buttons on newer radios for cars.

Accordingly, there is a need for a sign system for roads that provides additional information primarily to interested drivers.

SUMMARY OF THE INVENTION

The present invention is directed to a sign system for roads. The sign system includes a back sign including a mount affixed to the ground that is adjacent to a road and a means for notifying a driver of the availability of additional information on a back sign being approached. A back sign device is affixed to the mount. The mount has a front face that is visible to oncoming traffic. The back sign device is located on a rear face visible to traffic that has passed the back sign device. A driver can read the back sign device in a suitably focused mirror mounted upon their vehicle after passing the back sign device.

The sign system includes a broadcasting unit. The broadcasting unit may be in communication with a receiving unit positioned in a vehicle and adapted to communicate with the driver. The broadcasting unit may be in support of the back sign device, whereby, when the driver of the vehicle approaches a back sign, the receiving unit may be such as to alert only interested drivers of the upcoming availability of additional information.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1A:
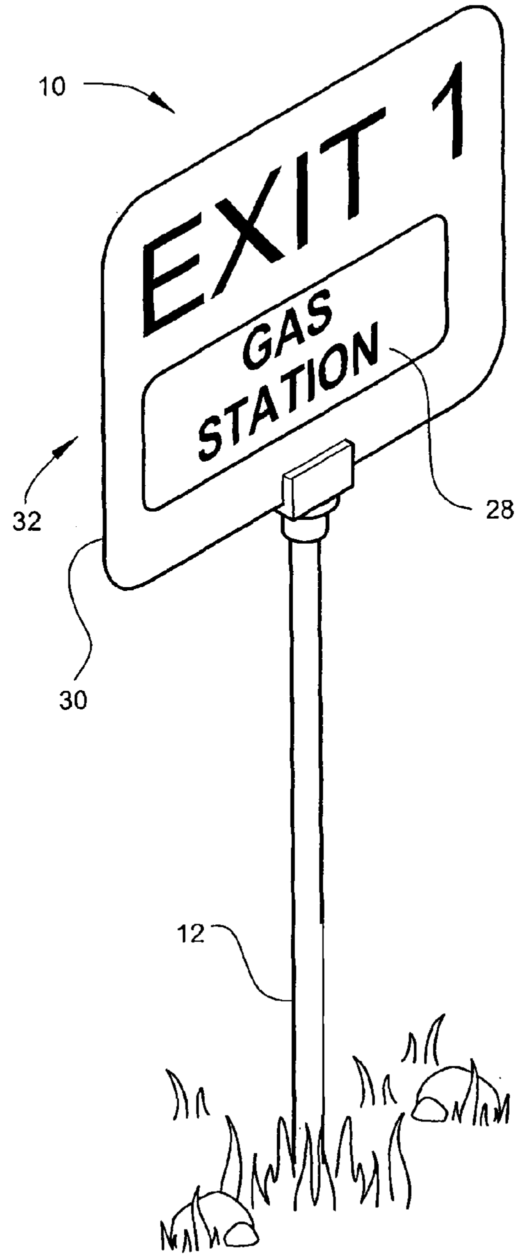
FIGS. 1*a* and 1*b* show isometric views of an embodiment of a sign system for roads.

Referring to the drawings, wherein like numerals indicate like elements, there is shown in FIGS. 1-4 a sign system for roads. In one embodiment, the sign system for roads includes a back sign 10, a broadcasting unit 34, and a receiving unit 36 positioned in a vehicle 38 (see FIGS. 3*a*, 3*b* and 4).

Back sign 10 may include a mount 12 and a back sign device 14. Back sign 10 may be located adjacent a road. Back sign 10 may provide information primarily to certain drivers. After the driver's vehicle has passed by back sign 10, the driver may see the information on back sign 10 by looking through a mirror 18 (see FIG. 2). Back sign 10 may be attached to a preexisting road information sign 32 or advertisement.

Figure 1B:
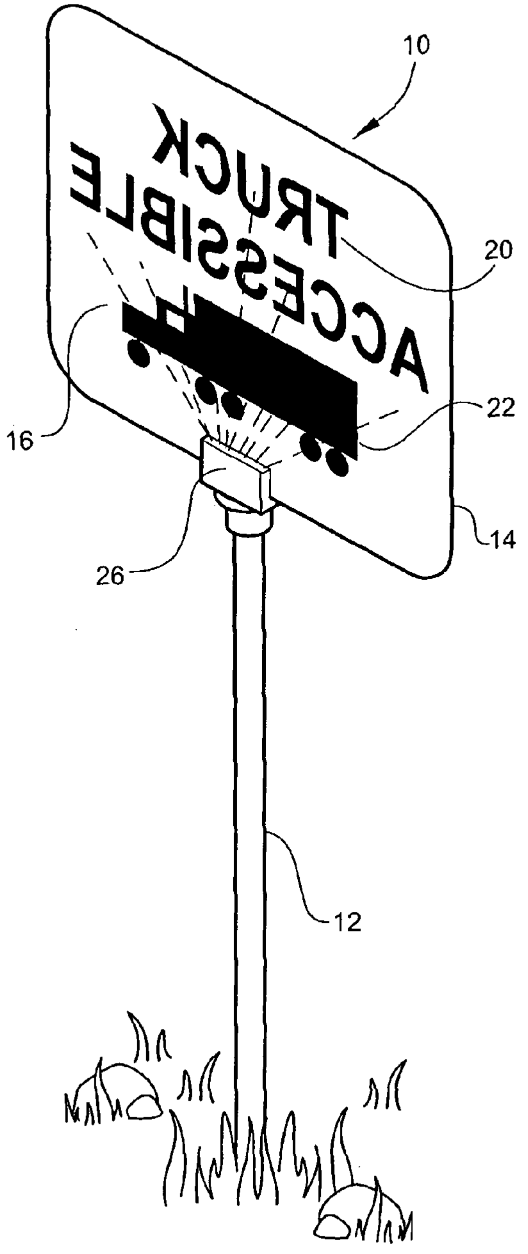

Mount 12 may be included in back sign 10 (see FIGS. 1*a* and 1*b*). Mount 12 may provide a support for back sign device 14. Mount 12 may be any structure that can support back sign device 14. Mount 12 may include, but is not limited to, a pole, beam, rod, platform, wall, etc. Mount 12 may be a preexisting road information sign 32 (see FIG. 1*a*) or advertisement, meaning, back sign device 14 may be attached to the back of the preexisting road information sign 32 or advertisement. Mount 12 may include a rear face 16. Mount 12 may also include a front face 28.

Back sign device 14 may be attached to mount 12 (see FIG. 1*b*). Back sign device 14 may be attached to mount 12 by a number of conventional means, including but not limited to, bolts, screws, latches, fasteners, joints, etc. Back sign device 14 may be for providing information to a driver. Back sign device 14 may be any device for providing information to a driver. Back sign device 14 may be located on rear face 16 of mount 12. Back sign device 14 may be viewed by a driver through mirror 18 after the driver's vehicle has passed back sign 10. Back sign device 14 may include any form of communication. This communication may include words/letters 20 that are written backwards. These words/letters 20 that are written backwards allow a driver to view them in mirror 18 so that the words/letters 20 appear normal. Back sign device 14 may include symbols/colors 22. The symbols/colors 22 may be any symbol or color, including, but not limited to a symbol or color that is recognizable to have a certain meaning to drivers.

Rear face 16 may be a part of mount 12 (see FIG. 1*b*). Rear face 16 may provide a face for back sign device 14. Rear face 16 may be faced in any direction. Preferably, rear face 16 may be faced in the direction where back sign device 14 is most visible to a vehicle that has passed by back sign 10. Rear face 16 may be opposite of front face 28 or may be at any angle to front face 28.

Front sign device 30 may be attached to mount 12 (see FIG. 1*a*). Front sign device 30 may be attached to mount 12 by a number of conventional means, including but not limited to, bolts, screws, latches, fasteners, joints, etc. Front sign device 30 may be for providing information to a driver. Front sign device 30 may be any device for providing information to a driver, including but not limited to, a conventional sign or advertisement. Front sign device 30 may be located on front face 28 of mount 12. Front sign device 30 may be viewed by a driver or passengers of a vehicle that are approaching back sign 10. Front sign device 30 may include any form of communication, including, but not limited to, words, letters, symbols, colors, figures, etc.

Front face 28 may be a part of mount 12 (see FIG. 1*a*). Front face 28 may provide a face for front sign device 30. Front face 28 may be faced in any direction. Preferably, front face 28 may be faced in the direction where front sign device 30 may be most visible to oncoming traffic.

Figure 2:
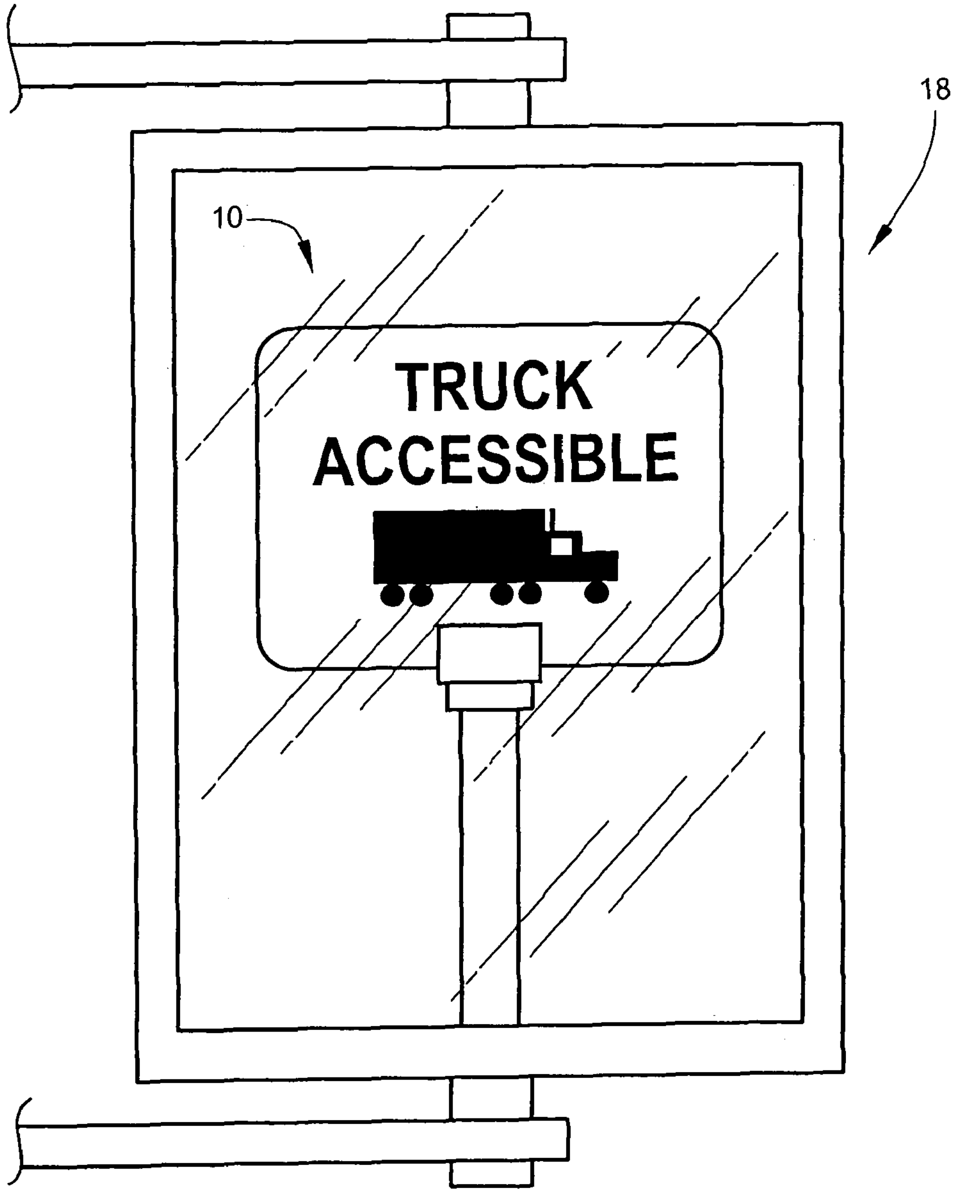
FIG. 2 shows an isometric view of the view through a mirror of the back sign for roads in FIG. 1*b*.

The mirror 18 of FIG. 2 may be any mirror. Mirror 18 may be a mirror mounted on or in a vehicle. Mirror 18 may be a standard side view mirror or a standard rearview mirror. Mirror 18 may be flat or convex and may be any shape or size.

A light 26 may be included in back sign 10 (see FIG. 1*b*). Light 26 may be for illuminating back sign device 14. Light 26 may be any light capable of illuminating back sign device 14.

In operation, back sign 10 may be positioned along a road, highway, interstate, etc. As vehicles approach back sign 10 the driver or passenger of a vehicle may read the communication on front sign device 30. After the vehicle passes by back sign 10, the driver may view back sign device 14 through mirror 18 (a side view or rear view) and obtain additional information about the communication on front sign device 30 or obtain information which is independent of front sign device 30.

For example, a truck driver may approach back sign 10 and see on front sign device 30 that a fuel station is available at the next exit. After the truck passes back sign 10, the truck driver may view back sign device 14 through mirror 18 and obtain information on whether or not the fuel station is truck accessible (see FIG. 2).

As another example, a truck driver may approach back sign 10 and see on front sign device 30 that a fuel station is available at the next exit. Because fuel station names are constantly changing, often times the problem of a known truck stop (like Pilot®) buying a non-accessible truck stop occurs (for example, Pilot® truck stops acquired Speedway® fuel stations and not all Speedway® stations are truck accessible). After the truck passes back sign 10, the truck driver may view back sign device 14 through mirror 18 and obtain information (such as Pilot® written backwards) on whether or not the fuel station is truck accessible.

Figure 3A:
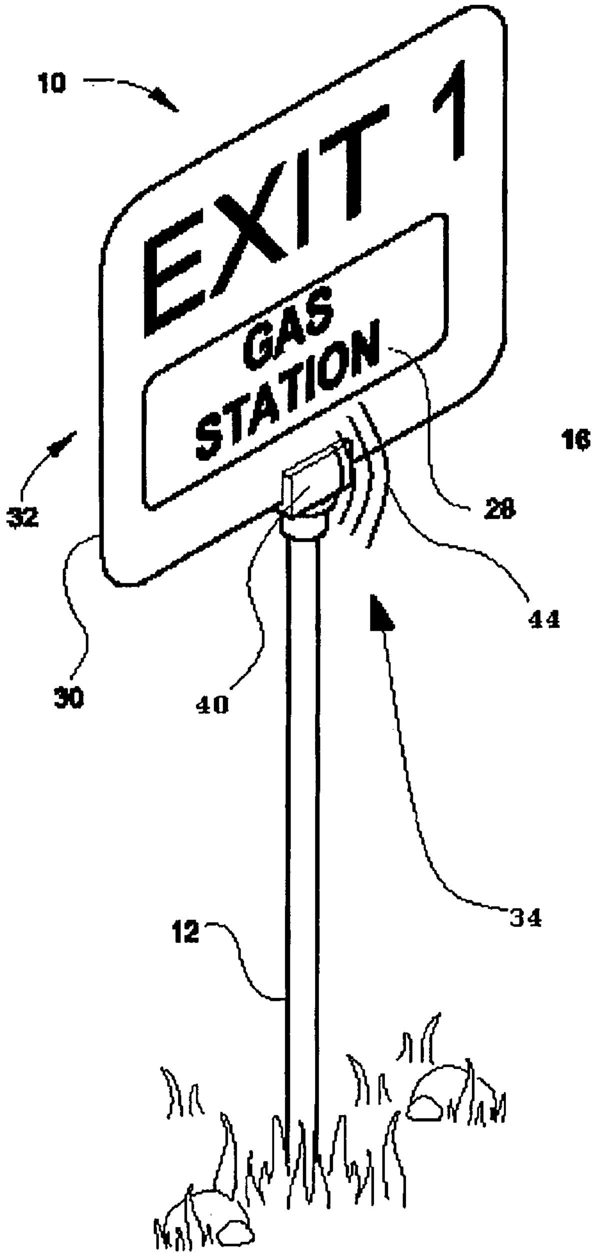
FIGS. 3*a* and 3*b* show isometric views of another embodiment of a sign system for roads.
Figure 3B:
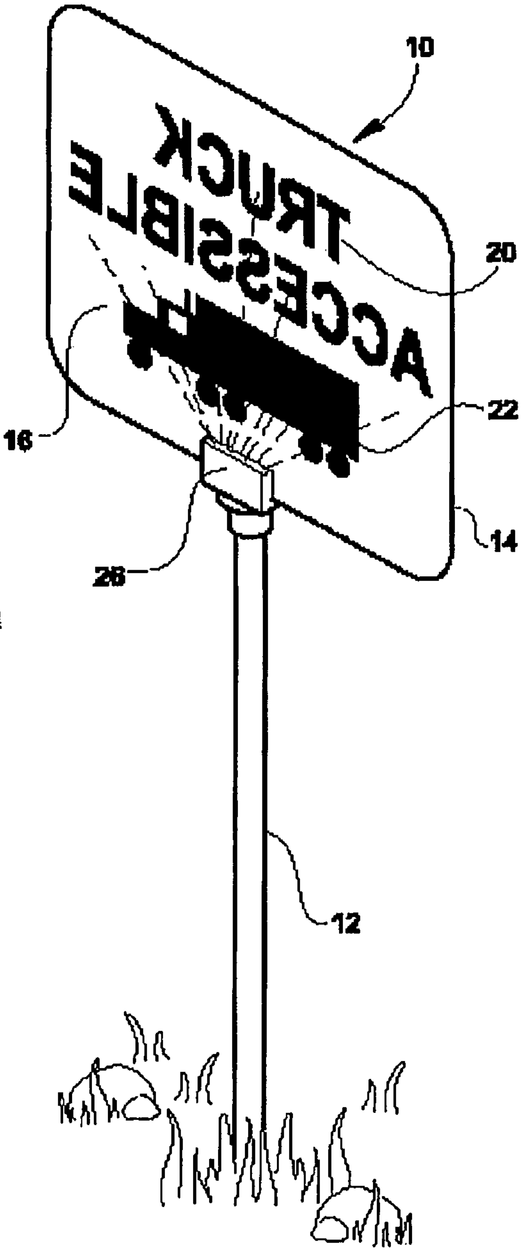
Figure 4:
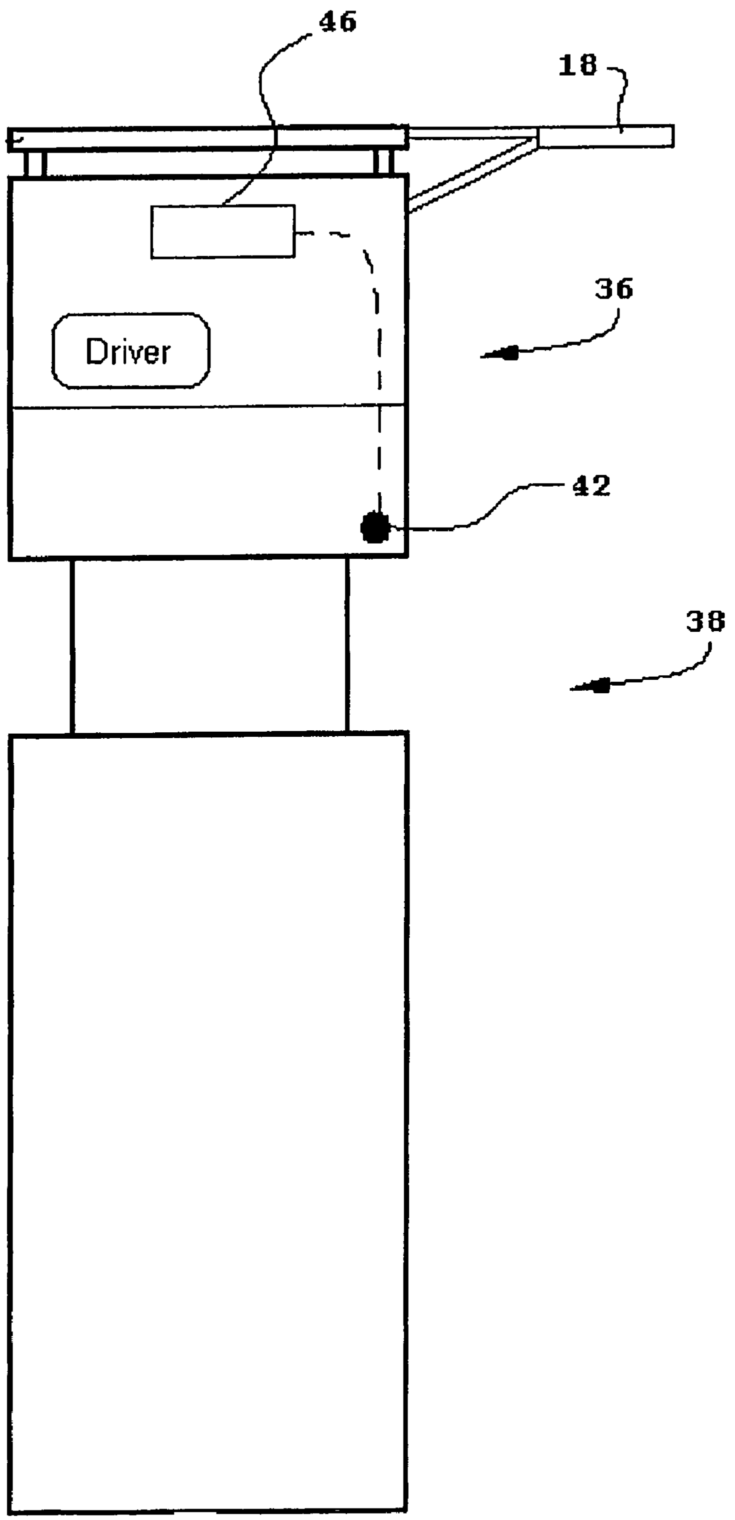
FIG. 4 shows a schematic view of a vehicle having a receiving unit for the sign system for roads.
Figure 5:
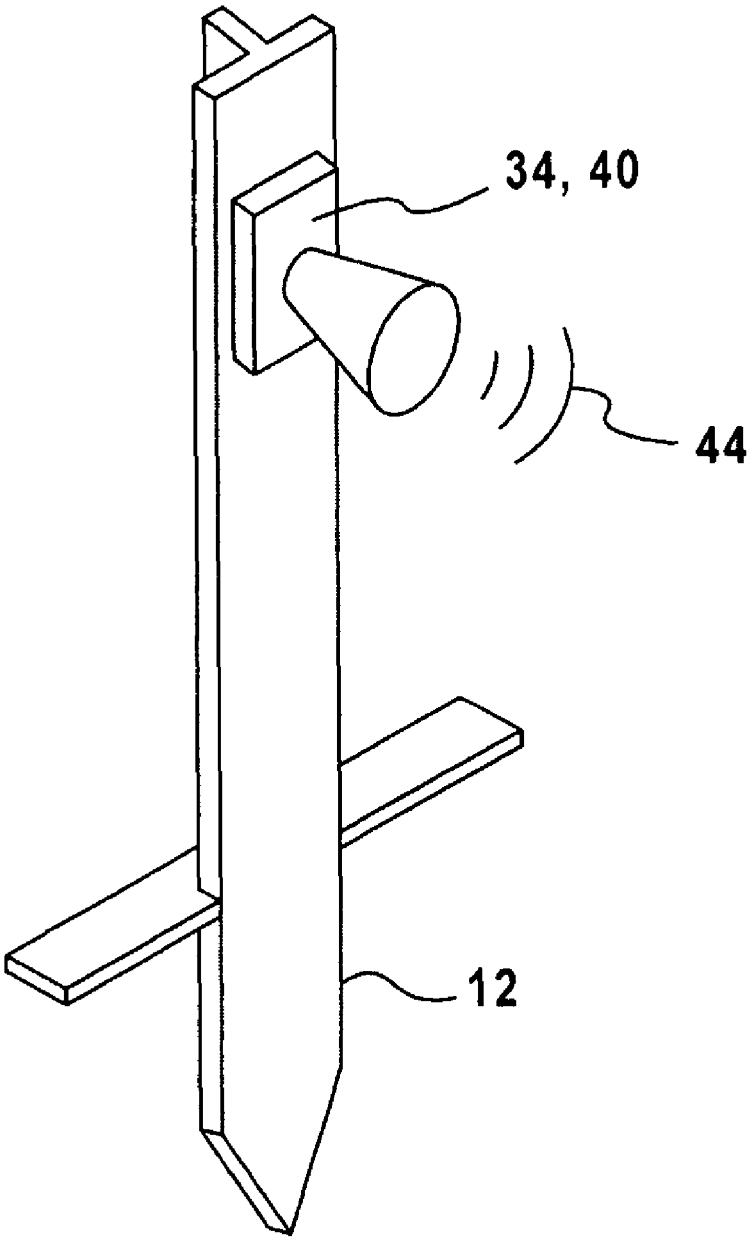
FIG. 5 shows an isometric view of another embodiment of the invention, with the sign omitted.

In the complete embodiment of the sign system for roads, broadcasting unit 34 may be included along with receiving unit 36 positioned in vehicle 38 (see FIGS. 3*a*, 3*b* and 4). Broadcasting unit 34 may be used for broadcasting a signal 44 to receiving unit 36 positioned in vehicle 38. Broadcasting unit 34 may be any device capable of broadcasting signal 44 to receiving unit 36 of an oncoming vehicle 38. Broadcasting unit 34 may be housed in a weather protected box 40. Broadcasting unit 34 may be, but is not limited to, a standard broadcasting transmitter. Broadcasting unit 34 may be an FCC approved transmitter. Broadcasting unit 34 may be a low powered transmitter, or one that broadcasts only a relatively short distance, on an FCC medically allowed radio frequency, thus not requiring an FCC license. In one embodiment, as shown in FIG. 3*a*, broadcasting unit 34 may be attached to back sign 10. In another embodiment, broadcasting unit 34 may be positioned in front of back sign 10 (or up the road from back sign 10) in order to provide a longer period of time to alert the driver before the driver passes back sign 10. FIG. 5 shows the broadcasting unit 34 attached to mount 12 without a back sign being attached. This embodiment also includes the situation where the broadcasting unit 34 may be used alone, without any separately mounted back sign. In this case, the broadcasting unit may be positioned to provide temporary or permanent information about upcoming road conditions. This position of broadcasting unit 34 may be utilized on higher speed roads, such as highways and interstates. One or more broadcasting units 34 may be positioned in an electronically staged manner to utilize and offset the effects of vehicle speed and distance.

Signal 44 may be a signal broadcast from broadcasting unit 34 (see FIG. 3*a*). Signal 44 may allow for communication between broadcasting unit 34 and receiving unit 36. Signal 44 may be any signal capable of communicating the same and/or additional information on back sign 10 to receiving unit 36, or that additional information will soon be available to the driver. Signal 44 may be a fixed or variable radio frequency signal which could be received by the receiving unit 36 and communicated to the driver of vehicle 38. Signal 44 may include one or more of a plurality of channels, one for cars and light trucks, another for large trucks, etc. Broadcasting unit 34 may cause signal 44 to be directional such that signal 44 will propagate to one side of the roadway and not the other.

Weather protected box 40 may be included on back sign 10 (see FIG. 3*a*). Weather protected box 40 may house and protect broadcasting unit 34 from the environment. Weather protected box 40 may be any housing capable of protecting broadcasting unit 34 from the environment.

Vehicle 38 may include receiving unit 36 (see FIG. 4). Vehicle 38 may be any vehicle approaching back sign 10, including, but not limited to, a car, a light truck, or a semi-trailer truck.

Receiving unit 36 may be positioned in vehicle 38 (see FIG. 4). Receiving unit 36 may receive signal 44 from broadcasting unit 34 and communicate the additional information to the driver of vehicle 38. Receiving unit 36 may be preference selectable by the driver or manufacturer to determine which type of information may be accepted from broadcasting unit 34, e.g., channel most pertinent to cars and light trucks, to large trucks, etc. Receiving unit 36 may be any device or devices capable of receiving signal 44 from broadcasting unit 34 and communicating the additional information to the driver of vehicle 38, in real time. Receiving unit 36 may include, but is not limited to, an antenna 42 and a display box 46. Receiving unit 36 may also contain a memory device to store information from broadcasting unit 34, to be played or displayed at a subsequent time. Each newly encountered broadcasting unit 34 may overwrite previously stored information.

Antenna 42 may be included in receiving unit 36 (see FIG. 4). Antenna 42 may receive signal 44 from broadcasting unit 34. Antenna 42 may be any device for receiving signal 44. Antenna 44 may be an additional feature of vehicle 38 or it may be included in a preexisting device, for example, a radio antenna, a CB radio antenna, a GPS unit antenna, a computer (laptop) internal antenna, or a cell phone antenna. Antenna 44 may be positioned anywhere on vehicle 38, including, but not limited to, the roof (as shown in FIG. 4) or a mirror holding bracket.

Display box 46 may be included in receiving unit 36 (see FIG. 4). Display box 46 may alert the driver of additional information received from broadcasting unit 34. Display box 46 may be any device for alerting the driver of additional information received from broadcasting unit 34. Display box 46 may be, but is not limited to: a simple light that is illuminated when receiving signal 44 to cause the driver to know by visual means that additional information is soon to be available; a speaker that makes a noise when receiving signal 44 to cause the driver to know by audible means that additional information is soon to be available; or a screen that displays a message when receiving signal 44 to cause the driver to know by visual means that additional information is soon to be available. Display box 46 may be a separate unit or it may be built into or included in vehicle 38 in other devices, including but not limited to, built into the radio of vehicle 38, built into the CB radio within vehicle 38, built into a computer (laptop) within vehicle 38, or built into a movable or fixed location GPS unit within vehicle 38. Display box 46 may also be built into a cellular phone device. Display box 46 may include a control for allowing the driver to choose whether display box 46 presents the driver with yet additional information. The control may be a power button for activating the speaker, display screen, or an additional feature of the display box, or the control may be a button to change the speaker, display, etc., from otherwise normal operation to operation which communicates the additional new information from broadcasting unit 34. The control may be voice activated by the driver.

In another embodiment, back sign 10 may be positioned along a road, highway, interstate, etc. As vehicle 38 approaches back sign 10, the broadcasting unit 34 may communicate with receiving unit 36. The driver or passenger of a vehicle may be alerted by display box 46 that additional information will be provided on back sign device 14, being approached. As vehicle 38 approaches back sign 10, the driver or passenger of vehicle 38 can read the communication on front sign device 30. After the vehicle passes by back sign 10, the driver may view back sign device 14 through mirror 18 (a side view or rear view) and obtain additional information about the communication on front sign device 30, or information independent of front sign device 30.

For example, a truck driver may approach back sign 10 and be alerted that back sign 10 contains additional information on back sign device 14. After the truck passes back sign 10, the truck driver may view back sign device 14 through mirror 18 and obtain information that a fuel station is available that is truck accessible.

In another embodiment of the invention, broadcasting unit 34 may be positioned along a road, highway, interstate, etc., absent a back sign. This may occur due to the pending of a possible future back sign installation or the lack of anticipation of a back sign.

In another embodiment of the invention, broadcasting unit 34 may be positioned along a road, highway, interstate, etc., in a temporary manner as a roadway emergency safety device. Broadcasting unit 34 may broadcast a multiplicity of signals 44 to receiving unit 36. One such signal 44 may activate a warning that additional information will soon be available. Another such signal 44 may activate a route planning GPS-type device to present a route around the emergency for cars and light trucks. Another such signal 44 may activate a GPS unit to present a route around the emergency for large trucks, since the former route may be different than the latter. Another signal 44 may activate a memory device in receiving unit 36 to record additional information for subsequent playback, visual or audio, at the convenience of the driver, as to the nature of the emergency, expected duration, etc. Temporary broadcasting unit 34 may be battery powered. The emergency broadcasting unit 34 may be programmable using a computer in a police cruiser, etc. which computer and broadcasting unit 34 may be adapted to exploit voice recognition software for voice clarity and uniformity when receiving unit 36 is presenting audible information to drivers. Broadcasting unit 34 may have coded access to discourage theft of the temporary broadcasting unit 34.

The present invention may be embodied in other forms without departing from the spirit and the essential attributes thereof, and, accordingly, reference should be made to the appended claims, rather than to the foregoing specification, as indicated in the scope of the invention.

We claim:

1. A sign system for roads comprising:

a back sign for roads including:

a mount affixed to the ground and adjacent a road, and having a front face visible to oncoming traffic;

a back sign device affixed to said mount and located on a rear face visible to traffic that has passed the back sign device, the back sign device has words and/or a symbol written backwards so that the words and/or the symbol appear normal when viewed from a mirror;

a broadcasting unit for broadcasting a signal providing additional information about the back sign device; and a receiving unit adapted to receive said signal from said broadcasting unit, wherein said receiving unit is positioned as an accessory device in a vehicle and is adapted to communicate with a driver of the vehicle, whereby, when said driver of said vehicle approaches said back sign, said receiving unit alerts the driver of said additional information about said back sign device such that the driver observes said back sign device in a mirror after passing the back sign.

2. The sign system as recited in claim 1, wherein said broadcasting unit is housed in a weather protected box.

3. The sign system as recited in claim 1, wherein said broadcasting unit is attached to said back sign.

4. The sign system as recited in claim 1, wherein said broadcasting unit is positioned adjacent said road and mounted separately from said back sign.

5. The sign system as recited in claim 1, wherein said receiving unit comprises: an antenna for receiving said signal from said broadcasting unit; and a display box linked with said antenna being configured for alerting the driver of said additional information about said back sign device.

6. The sign system as recited in claim 5, wherein said display box includes a light for visually alerting the driver of additional information on said back sign device.

7. The sign system as recited in claim 5, wherein said display box includes a speaker for verbally alerting the driver of additional information on said back sign device.

8. The sign system as recited in claim 7, wherein said speaker verbally alerts the driver through an audio message.

9. The sign system as recited in claim 5, wherein said display box includes a screen for visually alerting the driver of additional information on said back sign device.

10. The sign system as recited in claim 9, wherein said screen visually alerts the driver through a visual message.

11. The sign system recited in claim 5, wherein said display box includes a control, said control allowing the driver to choose whether said display box alerts the driver of additional information.

12. A sign system for roads, comprising:

a back sign for roads including:

a mount affixed to the ground and being adjacent a road, and having a front sign device being visible to oncoming traffic;

said front sign device being selected from the group consisting of: a road information sign, and an advertisement;

a back sign device affixed to said mount and located on a rear face visible to traffic that has passed the back sign device;

said back sign device having information for the driver selected from the group consisting of: words written backwards, a symbol, and a color; and a light for illuminating the back sign device;

a broadcasting unit attached to said back sign and being housed in a weather protected box;

a receiving unit being in communication with said broadcasting unit;

said receiving unit being positioned in a vehicle;

said receiving unit including:

an antenna for receiving a signal from said broadcasting unit; and a display box in communication with said antenna;

said display box alerting the driver of additional information on said back sign device from the group consisting of: a light, a speaker, and a screen;

said display box including a control, said control allowing the driver to choose whether said display box alerts the driver of additional information;

whereby, when said driver of said vehicle approaches said back sign, said receiving unit can alert the driver of additional information on said back sign device and a driver can see said back sign device in a mirror after passing the back sign.

13. The sign system for roads as recited in claim 1, wherein said back sign device has words written backwards indicating information to the driver.

14. The sign system for roads as recited in claim 1, wherein said back sign device includes a symbol indicating information to the driver.

15. The sign system for roads as recited in claim 1, wherein said back sign device includes a color indicating information to the driver.

16. The sign system for roads as recited in claim 1, further comprising a light for illuminating the back sign device.

17. The sign system for roads as recited in claim 1, wherein said front face includes a front sign device which is visible to oncoming traffic.

18. The sign system for roads as recited in claim 17, wherein said front sign device is a road information sign.

19. The sign system for roads as recited in claim 17, wherein said front sign device being an advertisement.

20. The sign system for roads as recited in claim 1, wherein said signal includes at least one of a plurality of channels, where each of said plurality of channels contains information specific for one of a plurality of kinds of vehicles.

21. The sign system for roads as recited in claim 1, wherein said signal is directional such that said signal propagates substantially on only one side of the road to which the mount is adjacent.

22. The sign system for roads as recited in claim 20, wherein the receiving unit is adapted to select one of said plurality of channels for reception based on preferences of one of the user and a manufacturer of said receiver.

23. The sign system for roads as recited in claim 5, wherein said display box is integrally contained in another accessory device installed in said vehicle.

24. The sign system for roads as recited in claim 1, wherein said receiving unit has a memory register for temporary storage of said additional information from said broadcasting unit for subsequent presentation at the election of the interested driver.

25. The sign system for roads as recited in claim 12, wherein said receiving unit has a memory register for temporary storage of said additional information from said broadcasting unit for subsequent presentation at the election of the interested driver.

* * * * *